United States Patent
Krenz et al.

(10) Patent No.: US 6,369,343 B1
(45) Date of Patent: Apr. 9, 2002

(54) METHOD AND APPARATUS FOR ELECTRICAL DISCHARGE MACHINING

(75) Inventors: Rudi Oskar Krenz, Albuquerque; Brett Wayne Byrnes, Tijeros; Willem Thomas DeGraaff, Albuquerque, all of NM (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/666,852

(22) Filed: Sep. 20, 2000

(51) Int. Cl.[7] .............................................. B23H 1/00
(52) U.S. Cl. ................................. 219/69.11; 219/69.2
(58) Field of Search ...................... 219/69.11, 69.15, 219/69.2

(56) References Cited

U.S. PATENT DOCUMENTS

| | | | |
|---|---|---|---|
| 3,562,474 A | * 2/1971 | Sellmann et al. | 219/69.2 |
| 3,786,223 A | * 1/1974 | O'Connor | 219/69.2 |
| 3,801,770 A | * 4/1974 | O'Connor | 219/69.2 |
| 3,963,894 A | 6/1976 | Wachtell et al. | 219/69.15 |
| 4,638,141 A | 1/1987 | Houman et al. | 219/69.2 |
| 4,853,512 A | 8/1989 | Scheider | 219/69.15 |
| 4,891,485 A | 1/1990 | Briffod | 219/69.15 |
| 5,075,530 A | 12/1991 | Lee | 219/69.11 |
| 5,530,217 A | 6/1996 | Knecht | 219/69.11 |
| 5,951,884 A | * 9/1999 | Futamura | 219/69.2 |

OTHER PUBLICATIONS

"Tech Talk," EDM Today, May/Jun. 1999, pp. 32–33.
Bates, Charles, "Faster and Deeper with Linear," American Machinist, Jun. 1999, pp. 54, 56 and 58.
"Scanning the Horizon," Modern Machine Shop, Jul. 1999, pp. 166and 168.

* cited by examiner

*Primary Examiner*—Geoffrey S. Evans
(74) *Attorney, Agent, or Firm*—Andrew C. Hess; V. Ramaswamy

(57) ABSTRACT

An electrical discharge machining (EDM) apparatus includes a single workpiece fixture for holding a workpiece and a plurality of machining heads for machining different features into the workpiece. For example, a first machining head is arranged to machine a first feature into the workpiece, and a second machining head is arranged to machine a second feature into the workpiece. Each machining head is connected to a separate control system so as to operate independently.

20 Claims, 3 Drawing Sheets

METHOD AND APPARATUS FOR ELECTRICAL DISCHARGE MACHINING

BACKGROUND OF THE INVENTION

This invention relates generally to electrical discharge machining and more particularly to electrical discharge machining workpieces, such as aircraft engine parts, which have several features machined therein.

Electrical discharge machining (EDM) is a well known process for forming features, such as holes, slots and notches of various shapes and configurations, in an electrically conductive workpiece. Conventional EDM apparatuses typically employ an electrode having the desired shape that is advanced toward the workpiece. A suitable power supply is applied to create an electrical potential between the workpiece and electrode for forming a controlled spark which melts and vaporizes the workpiece material to form the desired feature. The cutting pattern of the electrode is usually computer numerically controlled (CNC) whereby servomotors control the relative positions of the electrode and workpiece. During machining, the electrode and workpiece are immersed in a dielectric fluid, which provides insulation against premature spark discharge, cools the machined area, and flushes away the removed material.

One drawback to electrical discharge machining is that it is a relatively slow process, especially when several distinct features need to be machined into a single workpiece. This is particularly so in the aircraft engine industry where electrical discharge machining is widely used for machining various features into aircraft engine parts. To increase the manufacturing output of such parts, it is common to use an EDM apparatus that machines a number of parts at one time. Such an apparatus has a plurality of work stations, each of which has a workpiece fixture located in a single dielectric tank. The work stations are all typically connected to a common power supply. Thus, machining takes place in series one part at a time. That is, a spark will be created in the first work station and then the next work station and so on until each station has a spark supplied. This sequence is repeated until the machining operation is completed for each workpiece.

A problem with this type of apparatus is that whenever one station gets hung up (i.e., fails to discharge for some reason such as electrode misalignment or a EDM particle remaining in the electrode-workpiece gap) all of the stations will become hung up. And since all stations are stopped, it is not evident which station is causing the stoppage. Furthermore, each station must use the same electrode material and polarity because of the series power connection. Thus, each station machines the same feature into the parts. Parts requiring additional features must then be moved to another machine. This means that multiple machines, fixtures and part handling are required before a part is completed. For example, three operations using three different fixtures would be needed to completely machine a part having three different features. And the tank of dielectric fluid would need to be drained and refilled for each of the three operations as the part is moved from fixture to fixture.

Accordingly, there is a need for an EDM apparatus that more efficiently machines workpieces having multiple features to be machined therein.

SUMMARY OF THE INVENTION

The above-mentioned need is met by the present invention which provides an electrical discharge machining apparatus including a single workpiece fixture for holding a workpiece and a plurality of machining heads for machining different features into the workpiece. For example, a first machining head is arranged to machine a first feature into the workpiece, and a second machining head is arranged to machine a second feature into the workpiece.

The present invention and its advantages over the prior art will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
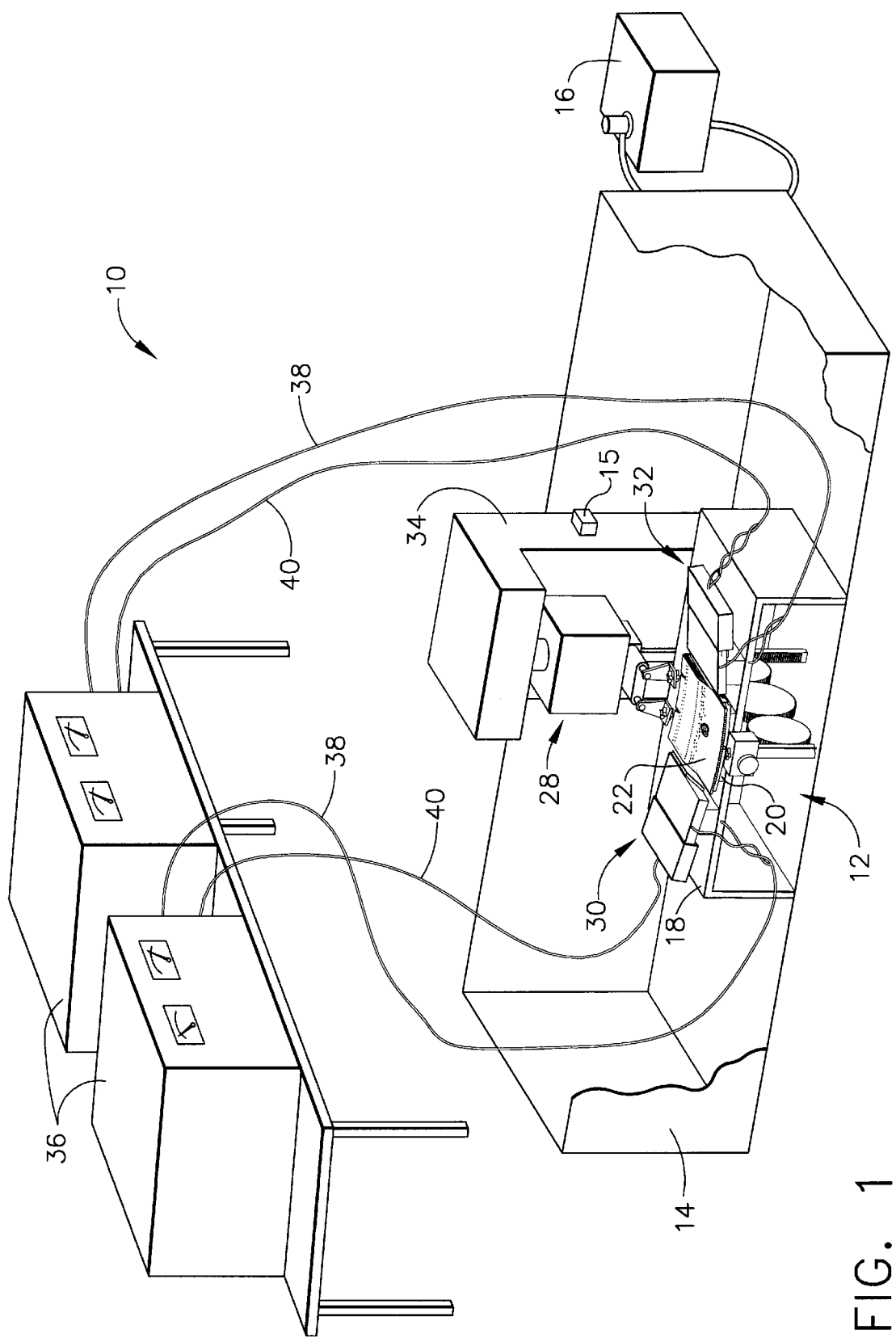
FIG. 1 is a schematic view of an EDM apparatus.

Referring to the drawings wherein identical reference numerals denote the same elements throughout the various views, FIG. 1 shows an electrical discharge machining (EDM) apparatus 10. The EDM apparatus 10 includes at least one work station 12 disposed in a tank 14, which is shown in partial cut-away to reveal the work station 12 therein. Although only one work station 12 is shown in FIG. 1 for purposes of illustration, it should be noted that additional such stations, operating independently, could be disposed in the tank 14. In which case, the EDM apparatus 10 could machine multiple workpieces at the same time. As is well known in the field, the tank 14 is filled with a suitable dielectric fluid, such as a dielectric oil, so that the workpiece is immersed in the fluid. The dielectric fluid insulates against premature spark discharge, cools the machined area, and flushes away machining debris. A float switch 15 is provided in the tank 14 for detecting when the dielectric fluid reaches a sufficient depth. A filtering system 16 is connected to the tank 14 for filtering the dielectric fluid, preferably down to one micron absolute.

The work station 12 includes a base 18 supported on the bottom of the tank 14. A workpiece fixture 20 for holding a workpiece 22 is attached to the upper surface of the base 18. The example workpiece 22 shown in FIG. 1 is a shroud for use in an aircraft engine. A typical aircraft engine employs a plurality of such shrouds arranged in an annular array around the engine's turbine rotor. The shrouds thus define an outer boundary for hot combustion gases flowing through the turbine. Shrouds are ordinarily made by a process in which a casting of the shroud is made, and various features are then machined into the casting. For example, the same shroud 22 of FIG. 1 has a number of anti-rotation notches 24 machined into its sides and a seal slot 26 machined into each end thereof. It should be noted that the shroud 22 is only an illustrative example of one workpiece that is suitable for use with the EDM apparatus 10. The present invention is not limited to such workpieces and is applicable to virtually any workpiece in which multiple features are machined.

The work station 12 further includes first, second and third machining heads 28, 30 and 32, wherein each machining head machines a different feature or set of features into the workpiece 22. The first machining head 28 is slidingly mounted above the workpiece fixture 20 on a column 34, and the second and third machining heads 30 and 32 are each mounted to the upper surface of the base 18, with the second machining head 30 adjacent to one end of the workpiece fixture 20 and the third machining head 32 adjacent to the other end of the workpiece fixture 20. It is noted that three machining heads are shown only by way of example. Different configurations having a different number of machining heads, depending on the particular requirements of the workpiece being machined, are within the scope of the present invention. The first machining head 28, which can be considered as the host machine, has a standard, built-in EDM control system. Each of the second and third machining heads 30 and 32, which can be considered as add-on machines, has a separate, standard EDM control system 36 associated therewith. As is known in the field, each EDM control system includes a power supply or spark generator and a controller, such as a computer numerical control (CNC). In the case of the second and third machining heads 30 and 32, the power supply provides energy to the corresponding machining head via a power cable 38, and the CNC is connected to the corresponding machining head via a servo cable 40 to control its positioning.

Figure 2:
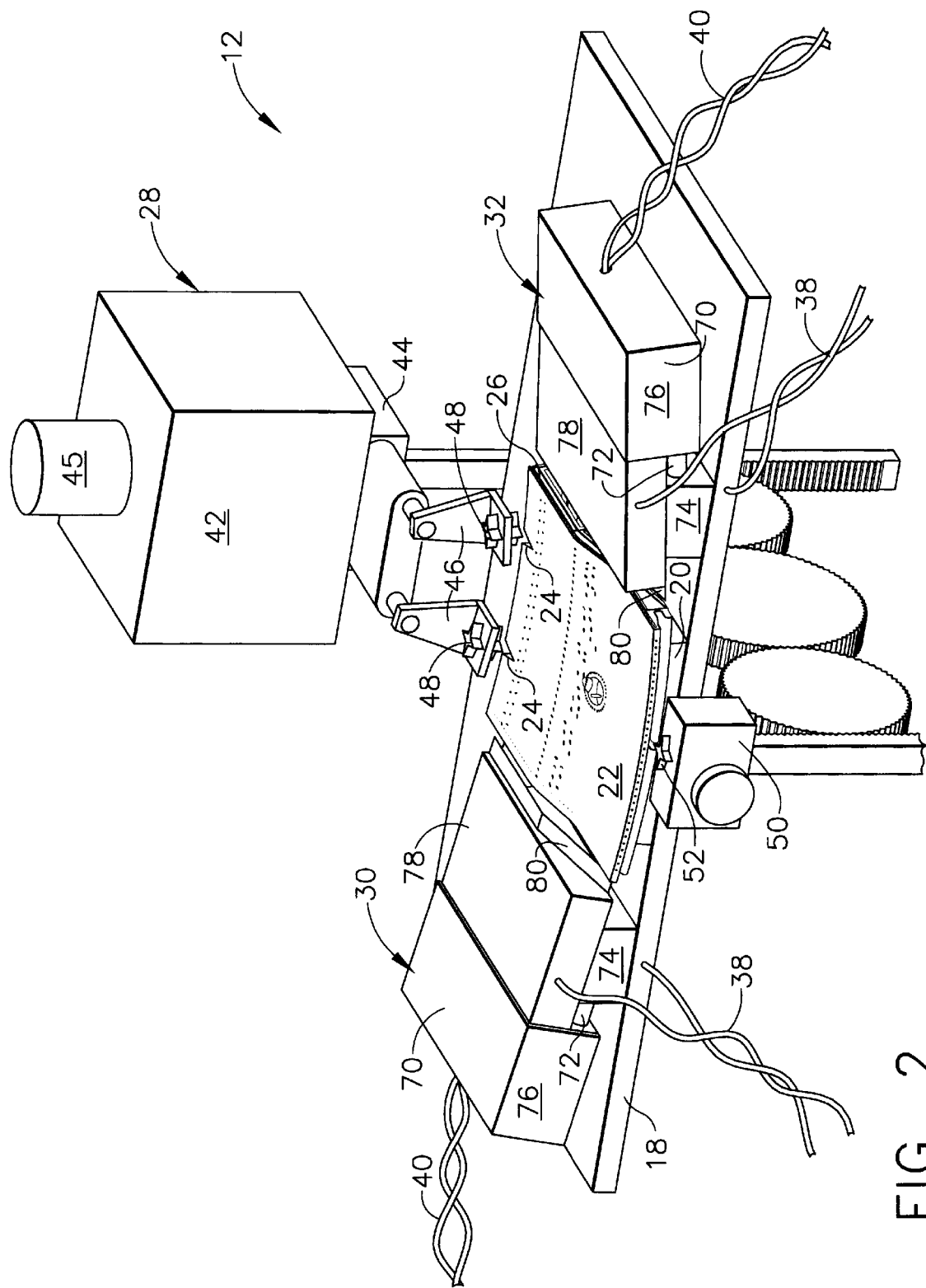
FIG. 2 is a detailed view of the work station from the EDM apparatus of FIG. 1.

Turning to FIG. 2, the work station 12 is shown in more detail. The first machining head 28 comprises a carrier 42 having a ram 44 mounted thereto. In a manner known in the art, the carrier 42 (and thus the ram 44) is slidingly supported above the workpiece fixture 20 on the column 34 (not shown in FIG. 2). The carrier 42 can be moved vertically toward or away from the workpiece 22 clamped in the workpiece fixture 20 a rotary servomotor 45 supported by the column 34. The servomotor 45 can alternatively be a linear servomotor.

The ram 44 includes two primary electrode holders 46, each supporting a primary electrode 48. A secondary electrode holder 50 holding a secondary electrode 52 is located on the opposite side of the workpiece fixture 20 from the primary electrode holders 46 and the ram 44. The primary and secondary electrodes 48 and 52 are cross-shaped so as to define four edges. The electrodes 48 and 52 can thus be rotated to present a clean edge as each edge becomes worn. This lengthens the time between electrode redressing (i.e., grinding worn edges).

Figure 3:
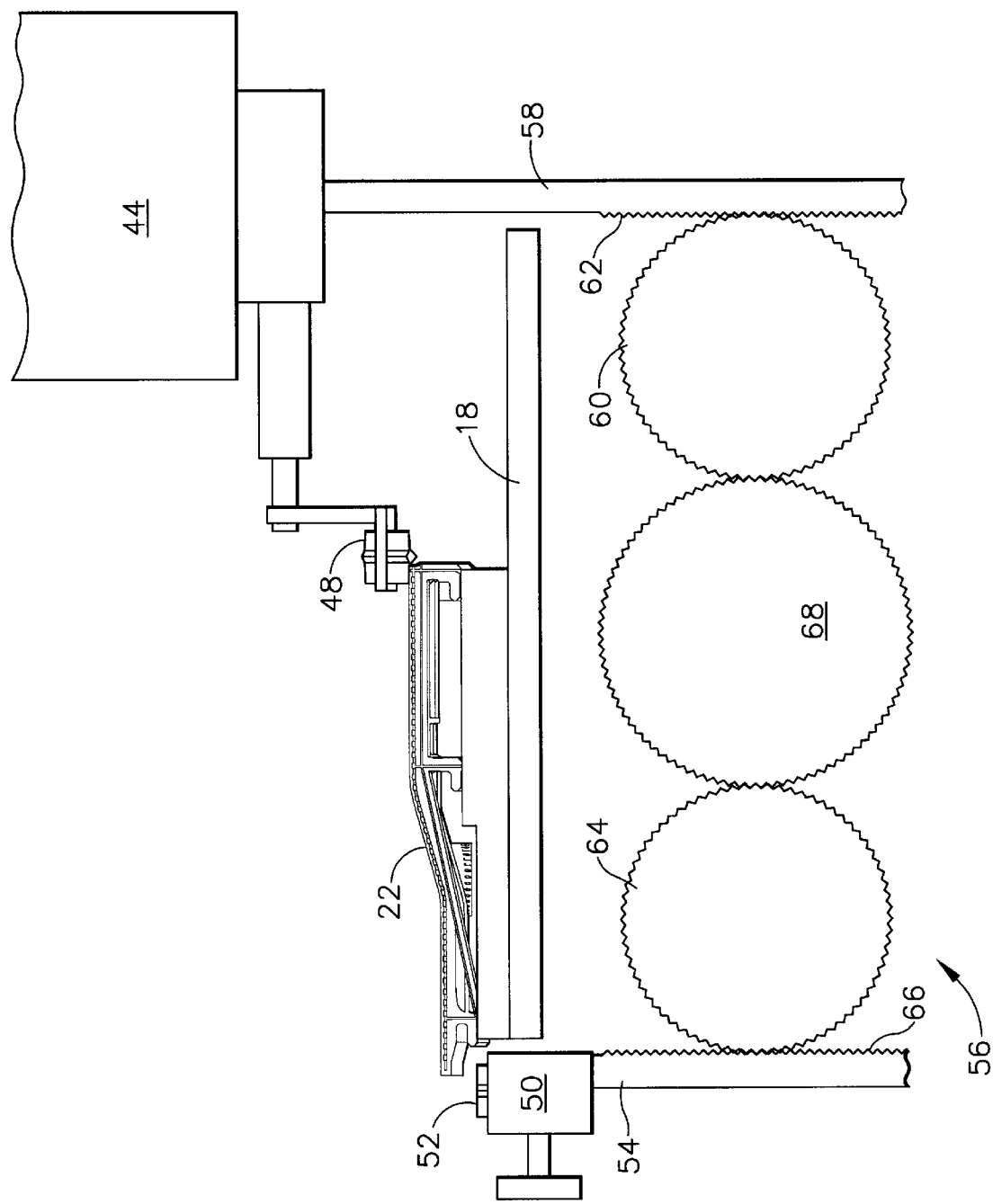
FIG. 3 is a side view showing an electrode control mechanism.

The secondary electrode holder 50 is moveably supported with respect to the workpiece fixture 20 by a support arm 54 arranged to move vertically. As seen best in FIG. 3, movement of the support arm 54 is controlled by the movement of the carrier 42 and the ram 44 via an electrode control mechanism 56 primarily located under the base 18. The mechanism 56 comprises a control arm 58 that extends downward from the bottom side of the ram 44. A first pinion 60 is rotatively mounted below the base 18 and meshes with a first rack 62 formed on the control arm 58; A second pinion 64 is rotatively mounted below the base 18 on the side opposite from the first pinion 60. The second pinion 64 meshes with a second rack 66 formed on the support arm 54. The first and second pinions 60 and 64 are drivingly connected by a transfer gear 68 such that downward movement of the ram 44 and control arm 58 will cause upward movement of the support arm 54 and the secondary electrode holder 50. Conversely, upward movement of the ram 44 and control arm 58 will cause downward movement of the support arm 54 and the secondary electrode holder 50. It should be noted, that while only a single transfer gear 68 is shown, this could be replaced with a multiple gear train, as long as the first and second pinions 60 and 64 are caused to rotate in the same direction. Using multiple transfer gears which permit the use of smaller diameter gears while still spanning the width of the base 18. It should also be noted that other electrode control means, such as a mechanical linkage, could be used as an alternative to the gear mechanism 56.

Referring again to FIG. 2, the second machining head 30 includes a linear servomotor 70 mounted to the upper surface of the base 18 by two support rods 72 and a block 74. The second machining head 30 is located adjacent to a first end of the workpiece fixture 20. It should be noted that while a linear servomotor is shown in FIG. 2 to facilitate disclosure of the present invention, a rotary servomotor could alternatively be used. However, linear motors are generally preferred because of their better speed, faster frequency response and positional accuracy. Linear servomotors are particularly advantageous in machining heads that machine features (such as the seal slots 26) where depth of cut accuracy is important.

The servomotor 70 comprises a linear motor forcer 76, which is fixed with respect to the base 18, and a linear motor U-channel 78, which is slidingly mounted on the forcer 76. An electrode 80 is attached to the distal end of the U-channel 78. The linear servomotor 70 operates in a conventional manner in that when the motor is energized, the U-channel 78 is caused to move linearly with respect to the forcer 76. The servomotor 70 is arranged so that the U-channel 78 will move toward or away from the end of the workpiece 22, with the electrode 80 located adjacent to the end of the workpiece 22. In the case of a curved workpiece, such as the shroud 22, the servomotor 70 is arranged at a slight angle with respect to the base 18 to accommodate the curvature of the workpiece. The displacement of the U-channel 78 is dictated by signals sent from the CNC in the EDM control system 36 via the servo cable 40 that is coupled to the servomotor 70.

A linear measuring scale (not shown) is mounted adjacent to the servomotor 70. The linear measuring scale is a conventional device that precisely measures the position and velocity of the U-channel 78 and provides feedback of these measurements to the CNC in the EDM control system 36. The third machining head 32 is essentially identical to the second machining head 30, except that it is mounted on the base 18 adjacent to the opposite end of the workpiece fixture 20.

In operation, a new workpiece 22 is loaded into the workpiece fixture 22 and the machining process is initiated by pressing a start button on the host or first machining head 28. This causes the tank 14 to be filled with dielectric fluid. When the fluid reaches a sufficient level, immersing the workpiece 22, the float switch 15 is tripped, activating the three machining heads 28, 30 and 32. The machining heads 28, 30 and 32 operate generally simultaneously, but independently of one another, to machine the respective features into the workpiece 22.

In the first machining head 28, the servomotor 45 moves the carrier 42 downward under the control of the EDM control system. This causes the ram 44 to move downward such that the primary electrodes 48 are advanced toward the workpiece 22. At the same time, the secondary electrode 52 is advanced upward toward the workpiece 22 by means of the electrode control mechanism 56. The electrodes 48 and 52 are energized by the power supply in the EDM control system for providing electrical energy to produce electrical discharges or sparks between the electrodes 48 and 52 and the workpiece 22. As the sparks vaporize the workpiece material, the servomotor continues to advance the electrodes 48 and 52 as dictated by the EDM control system until the desired features (the anti-rotation notches 24) are finished. The electrodes 48 and 52 are then retracted under control of the EDM control system. Specifically, the ram 44 is moved upward, which causes the secondary electrode holder 50 to be moved downward.

In each of the second and third machining heads 30 and 32, the servomotor 70 advances the U-channel 78 and the electrode 80 toward the workpiece 22 under the control of the respective EDM control system 36. The electrodes 80 are energized by the power supply in the respective EDM control system 36 for providing electrical energy to produce electrical discharges or sparks between the electrodes 80 and the workpiece 22 when the electrodes 80 are positioned adjacent to the workpiece 22. As the sparks vaporize the workpiece material, the servomotors 70 continues to advance the corresponding electrodes 80 as dictated by the EDM control systems 36 until the desired features (the seal slots 26) are finished. At this point, the servomotors 70 retract the electrodes 80 and EDM power is switched off.

When all machining operations are completed, the dielectric fluid is drained from the tank 14 so that the machined workpiece 22 can be removed from the workpiece fixture. The work station 12 is then ready for the next cycle.

The multiple machining heads 28, 30 and 32 of the EDM apparatus 10 operate independently because each machining head has its own EDM control system, which includes a power supply and a servocontrol. The machining heads 28, 30 and 32 can machine all features (the anti-rotation notches 24 and the seal slots 26) simultaneously instead of operating in series, one spark at a time. Moreover, all of the machining is accomplished in a single drain and refill cycle of the tank 14. And while the electrodes 48 and 52 operate with the same polarity, they do not necessarily have to be made of the same material.

The foregoing has described an EDM apparatus that more efficiently machines workpieces, particularly aircraft engine parts, having multiple features. While specific embodiments of the present invention have been described, it will be apparent to those skilled in the art that various modifications thereto can be made without departing from the spirit and scope of the invention as defined in the appended claims.

What is claimed is:

1. An electrical discharge machining apparatus for machining a workpiece having a plurality of features, said electrical discharge machining apparatus comprising:
   a single workpiece fixture for holding said workpiece;
   a first machining head arranged to machine a first feature into said workpiece, said first machining head comprising:
      a ram slidingly supported with respect to said workpiece fixture so as to be moveable toward and away from said workpiece fixture, and at least one electrode mounted on said ram, and
      an electrode holder supported with respect to said workpiece fixture so as to be moveable toward and away from said workpiece fixture, said electrode holder being located on a side of said workpiece fixture opposite from said ram, and at least one electrode mounted on said electrode holder, wherein said ram and said electrode holder are drivingly connected to each other; and
   a second machining head arranged to machine a second feature into said workpiece.

2. The electrical discharge machining apparatus of claim 1 further comprising a control mechanism for controlling movement of said electrode holder.

3. The electrical discharge machining apparatus of claim 2 wherein said control mechanism comprises a gear mechanism connecting said ram and said electrode holder.

4. The electrical discharge machining apparatus of claim 1 wherein said electrodes are shaped so as to define multiple edges.

5. The electrical discharge machining apparatus of claim 1 further comprising a servomotor for moving said ram.

6. The electrical discharge machining apparatus of claim 1 wherein said second machining head comprises a linear servomotor having a forcer, a U-channel slidingly mounted on said forcer, and an electrode attached to said U-channel.

7. The electrical discharge machining apparatus of claim 6 wherein said linear servomotor is arranged so that said U-channel will be moved toward and away from said workpiece fixture.

8. The electrical discharge machining apparatus of claim 6 further comprising a power supply for energizing said electrode and a controller for controlling workpiece positioning via said servomotor.

9. The electrical discharge machining apparatus of claim 1 further comprising a dielectric tank, and wherein said workpiece fixture, said first machining head and said second machining head are disposed in said tank.

10. The electrical discharge machining apparatus of claim 1 further comprising at least one additional machining head arranged to machine an additional feature into said workpiece.

11. An electrical discharge machining apparatus for machining a workpiece having a plurality of features, said electrical discharge machining apparatus comprising:
   a dielectric tank;
   a base disposed in said tank;
   a single workpiece fixture for holding said workpiece mounted to said base;
   a first machining head arranged to machine a first feature into said workpiece, said first machining head comprising:
      a column disposed in said tank;
      a carrier slidingly supported on said column so as to be moveable toward and away from said workpiece fixture;
      a ram mounted on said carrier above said workpiece fixture;
      at least one primary electrode holder mounted on said ram; and
      a primary electrode mounted on said primary electrode holder; a secondary electrode holder supported with respect to said workpiece fixture so as to be moveable toward and away from said workpiece fixture, said secondary electrode holder being located on a side of said workpiece fixture opposite from said primary electrode holder; and
      at least one secondary electrode mounted on said secondary electrode holder, wherein said ram and said electrode holder are drivingly connected to each other; and
   a second machining head arranged to machine a second feature into said workpiece.

12. The electrical discharge machining apparatus of claim 11 further comprising a control mechanism for controlling movement of said secondary electrode holder.

13. The electrical discharge machining apparatus of claim 12 wherein said control mechanism comprises a gear mechanism connecting said ram and said secondary electrode holder, said gear mechanism being located under said base.

14. The electrical discharge machining apparatus of claim 11 wherein said primary and secondary electrodes are shaped so as to define multiple edges.

15. The electrical discharge machining apparatus of claim 11 further comprising a servomotor for moving said ram.

16. The electrical discharge machining apparatus of claim 11 wherein said second machining head comprises a linear servomotor having a forcer mounted on said base, a U-channel slidingly mounted on said forcer, and an electrode attached to said U-channel.

17. The electrical discharge machining apparatus of claim 16 wherein said linear servomotor is arranged so that said U-channel will be moved toward and away from said workpiece fixture.

18. The electrical discharge machining apparatus of claim 16 further comprising a power supply for energizing said electrode and a controller for controlling workpiece positioning via said servomotor.

19. The electrical discharge machining apparatus of claim 11 further comprising at least one additional machining head arranged to machine an additional feature into said workpiece.

20. A method of electrical discharge machining a workpiece having a plurality of features, said method comprising:

providing a single workpiece fixture;

providing a first machining head adjacent to said workpiece fixture; said first machining head comprising:

a ram slidingly supported with respect to said workpiece fixture so as to be moveable toward and away from said workpiece fixture, and at least one electrode mounted on said ram, and an electrode holder supported with respect to said workpiece fixture so as to be moveable toward and away from said workpiece fixture, said electrode holder being located on a side of said workpiece fixture opposite from said ram, and at least one electrode mounted on said electrode holder, wherein said ram and said electrode holder are drivingly connected to each other;

providing a second machining head adjacent to said workpiece fixture;

loading said workpiece into said workpiece fixture;

using said first machining head to machine a first feature into said workpiece; and using said second machining head to machine a second feature into said workpiece.

* * * * *